(12) United States Patent  (10) Patent No.: US 8,646,268 B2
Kim et al.  (45) Date of Patent: Feb. 11, 2014

(54) MASTER CYLINDER FOR A VEHICLE

(75) Inventors: Young Taek Kim, Cheongju-si (KR);
Sang Bo Kim, Daegu (KR); Jong Dae Weon, Daegu (KR); Tae Jun Ha, Daegu (KR)

(73) Assignee: Korea Delphi Automotive Systems Corporation, Daegu (KR)

( * ) Notice: Subject to any disclaimer, the term of this patent is extended or adjusted under 35 U.S.C. 154(b) by 853 days.

(21) Appl. No.: 12/863,876

(22) PCT Filed: Jan. 22, 2009

(86) PCT No.: PCT/KR2009/000340
§ 371 (c)(1),
(2), (4) Date: Jul. 21, 2010

(87) PCT Pub. No.: WO2009/093850
PCT Pub. Date: Jul. 30, 2009

(65) Prior Publication Data
US 2010/0287931 A1  Nov. 18, 2010

(30) Foreign Application Priority Data

Jan. 22, 2008 (KR) .................. 10-2008-0006584
Apr. 10, 2008 (KR) .................. 10-2008-0033285

(51) Int. Cl.
*B60T 11/16* (2006.01)
(52) U.S. Cl.
USPC ............................................. 60/588; 60/562
(58) Field of Classification Search
USPC ................................................... 60/562, 588
See application file for complete search history.

(56) References Cited

U.S. PATENT DOCUMENTS

| 6,978,614 B2 * | 12/2005 | Bourlon et al. ............... 60/588 |
| 2005/0044852 A1 | 3/2005 | Tsubouchi et al. |
| 2006/0064978 A1 * | 3/2006 | Mouri et al. ................... 60/562 |
| 2008/0087016 A1 * | 4/2008 | Shepherd et al. ............... 60/562 |

FOREIGN PATENT DOCUMENTS

| JP | 2006-273293 | 10/2006 |
| KR | 1020070062255 | 6/2007 |
| KR | 1020070062258 | 6/2007 |

OTHER PUBLICATIONS

International Search Report issued Sep. 7, 2009 in International Patent Publication No. WO 2009/093850.

* cited by examiner

*Primary Examiner* — Thomas E Lazo
(74) *Attorney, Agent, or Firm* — H.C. Park & Associates, PLC (57) ABSTRACT

Disclosed herein is a master cylinder for a vehicle. The master cylinder includes a housing, a piston, inlet ports and a seal. The housing has therein a liquid pressure chamber to contain oil. The piston reciprocates in the liquid pressure chamber to control the pressure in the liquid pressure chamber. A front end of the piston has a stepped structure. The inlet ports are provided in the housing so that oil is supplied into the liquid pressure chamber through the inlet ports. The seal is seated into a seating depression which is formed in the inner surface of the housing. The seal opens or closes a flow path of the oil depending on whether the seal is brought into contact with the piston. The oil flows into the liquid pressure chamber along the stepped outer surface of the piston through a space defined between the piston and the seal.

11 Claims, 14 Drawing Sheets

MASTER CYLINDER FOR A VEHICLE

CROSS-REFERENCE TO RELATED APPLICATIONS

This application is the National Stage of International Application No. PCT/KR2009/000340, filed Jan. 22, 2009, and claims priority from and the benefit of Korean Patent Application No. 10-2008-0006584, filed on Jan. 22, 2008, and Korean Patent Application No. 10-2008-0033285, filed on Apr. 10, 2008, which are all hereby incorporated by reference for all purposes as if fully set forth herein.

BACKGROUND OF THE INVENTION

1. Field of the Invention

The present invention relates generally to master cylinders for vehicles and, more particularly, to a master cylinder which generates hydraulic pressure in a hydraulic brake system of a vehicle.

2. Description of the Related Art

Generally, master cylinders for vehicles are apparatuses for generating hydraulic pressure when brake pedals are applied.

In hydraulic brake systems for vehicles, oil supplied from an oil reservoir is compressed by a master cylinder to generate liquid pressure. The liquid pressure is transmitted to wheels through a brake hydraulic pressure line.

The liquid pressure transmitted to the wheels brings a brake shoe or disc into contact with the inner surface of a brake drum, thus generating friction braking force.

Figure 1:
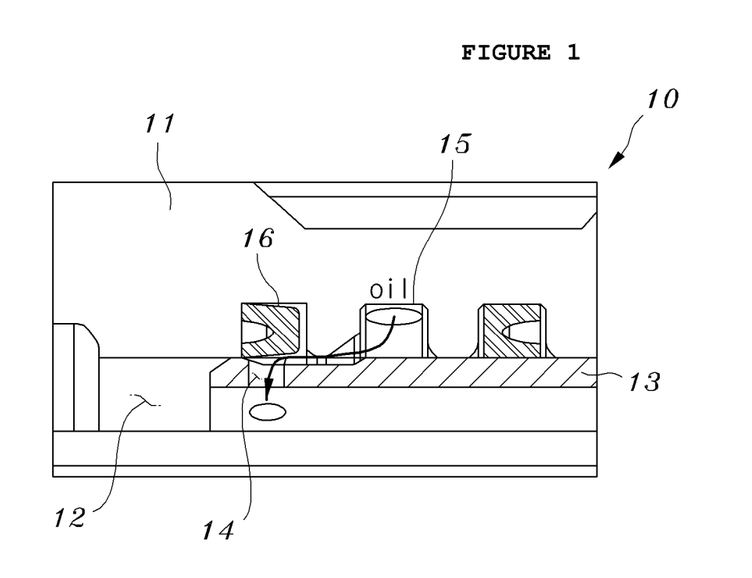
FIGS. 1 and 2 are views showing a path along which oil is drawn into a master cylinder for a vehicle, according to a conventional technique.
Figure 2:
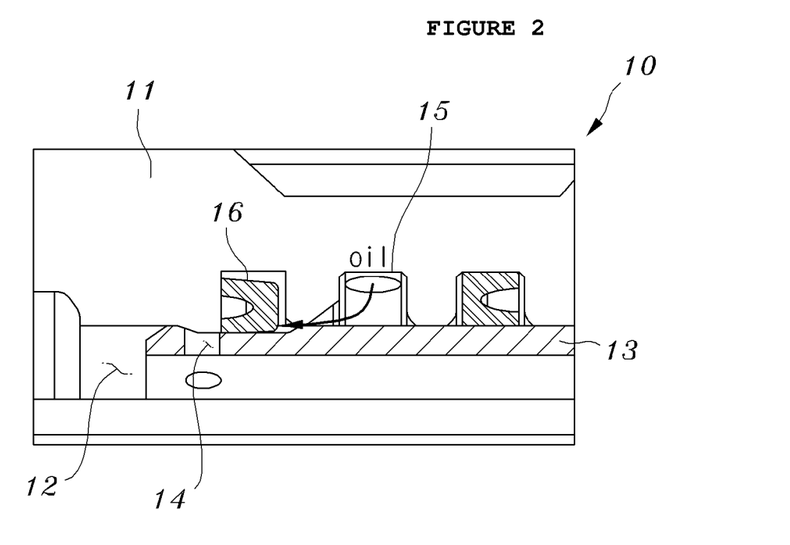

FIGS. 1 and 2 are views showing a path along which oil is drawn into a master cylinder 10 for a vehicle, according to a conventional technique.

Referring to FIG. 1, the conventional master cylinder 10 includes a housing 11 in which a liquid pressure chamber 12 is formed, a piston 13 which reciprocates in the liquid pressure chamber 12, an inlet port 15 which supplies oil into the liquid pressure chamber 12, and a seal 16 which allows or interrupts the supply of oil into the liquid pressure chamber 12.

A plurality of bypass holes 14 is formed in the piston 13 to provide a path along which oil is supplied from the inlet port 15 into the liquid pressure chamber 12.

When the piston 13 is in an initial stationary state or when the piston 13 linearly moves and the bypass holes 14 formed in the piston 13 are positioned within a range of the seal 16 (in other words, when the bypass holes 14 are positioned adjacent to the inlet port 15), oil is allowed to be supplied into the liquid pressure chamber 12 through the bypass holes 14.

Referring to FIG. 2, when the piston 13 linearly moves and the bypass holes 14 are beyond the edge of the seal 16 (in other words, the seal 16 is positioned between the bypass holes 14 and the inlet port 15), the edge of the seal 16 is brought into contact with the circumferential outer surface of the piston 13.

The contact between the piston 13 and the seal 16 interrupts the path along which oil is supplied into the liquid pressure chamber 12, so that oil supplied from the inlet port 15 cannot be drawn into the liquid pressure chamber 12 through the bypass holes 14.

However, in the master cylinder according to the conventional technique having the above-mentioned construction, because the plurality of bypass holes 14 is formed in the piston 13, the costs required to process the master cylinder are increased. Furthermore, due to presence of the bypass holes 14, there is a problem in that the overall length of the master cylinder is increased.

SUMMARY OF THE INVENTION

Exemplary embodiments of the present invention provide a master cylinder capable of preventing a seal from being damaged by backflow of oil after traction control system (TCS) or electronic stability control (ESC) operation, and improving the flow of oil of a brake system, thereby reducing to process costs.

Additional features of the invention will be set forth in the description which follows, and in part will be apparent from the description, or may be learned by practice of the invention.

Exemplary embodiments of the invention provide a master cylinder for a vehicle. The master cylinder includes a housing comprising a liquid pressure chamber to contain oil. The master cylinder also includes a piston of the liquid pressure chamber reciprocating in the liquid pressure chamber to control pressure in the liquid pressure chamber. The piston includes a front end having a stepped circumferential outer surface. The piston also includes a plurality of inlet ports provided in the housing to supply the oil into the liquid pressure chamber. A seal is seated into a seating depression, and the seating depression is formed in an inner surface of the housing at a position spaced apart from the inlet ports by a distance. The seal controls opening of a flow path of the oil depending on whether the seal is brought into contact with the piston. The oil flows into the liquid pressure chamber along the stepped circumferential outer surface of the piston through a space defined between the piston and the seal.

Accordingly, the present invention has been made keeping in mind the above problems occurring in the prior art, and an object of the present invention is to provide a master cylinder for a vehicle which is configured such that the processing costs thereof are reduced, a seal is prevented from being damaged by backflow of oil after TCS or ESC operation, and the flow of oil of a brake system is improved.

In order to accomplish the above object, the present invention provides a master cylinder for a vehicle, including a housing, a piston, a plurality of inlet ports and a seal. The housing has therein a liquid pressure chamber to contain oil. The piston is installed in the liquid pressure chamber. The piston reciprocates in the liquid pressure chamber to control pressure in the liquid pressure chamber. The piston includes a front end having a stepped circumferential outer surface. The inlet ports are provided in the housing so that the oil is supplied into the liquid pressure chamber through the inlet ports. The seal is seated into a seating depression which is formed in an inner surface of the housing at a position spaced apart from the inlet ports by a predetermined distance. The seal controls opening of a flow path of the oil depending on whether the seal is brought into contact with the piston. The oil flows into the liquid pressure chamber along the stepped circumferential outer surface of the piston through a space defined between the piston and the seal.

The seal may have a shape which branches off into three branches comprising an outer lip, a center lip and an inner lip. The outer lip and the center lip of the seal may be fastened to the seating depression, and the inner lip may protrude into the liquid pressure chamber.

Furthermore, when the front end of the piston comes into contact with a medial portion of the inner lip, the flow path of the oil is interrupted.

The stepped circumferential outer surface of the front end of the piston may comprise a concavely-stepped circumferential outer surface.

In addition, an edge of the front end of the piston may be tapered. The tapered edge of the front end of the piston may come into surface contact with the medial portion of the center lip of the seal.

Furthermore, an edge of the circumferential outer surface of the front end of the piston may be rounded.

Preferably, a through-hole may be formed through the stepped portion of the front end of the piston in a thickness-wise direction.

Alternatively, a groove may be formed in an edge of the first end of the piston in a thickness-wise direction.

In addition, an end of the inlet port may be tapered towards the seating depression.

As described above, in a master cylinder for a vehicle according to the present invention, a front end of a piston has a stepped structure, and a space between a seal and the circumferential outer surface of the piston is used as a path along which oil flows. Thus, the work of processing of the master cylinder can be facilitated, so that the production cost thereof can be reduced.

Furthermore, the master cylinder is configured such that the front end of the piston comes into contact with a medial portion of the seal. Thereby, the seal can be prevented from being damaged by liquid pressure applied thereto backwards when the brake is released after TCS or ESC operation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DESCRIPTION OF THE PREFERRED EMBODIMENTS

Hereinafter, exemplary embodiments of the present invention will be described in detail with reference to the attached drawings.

Figure 3:
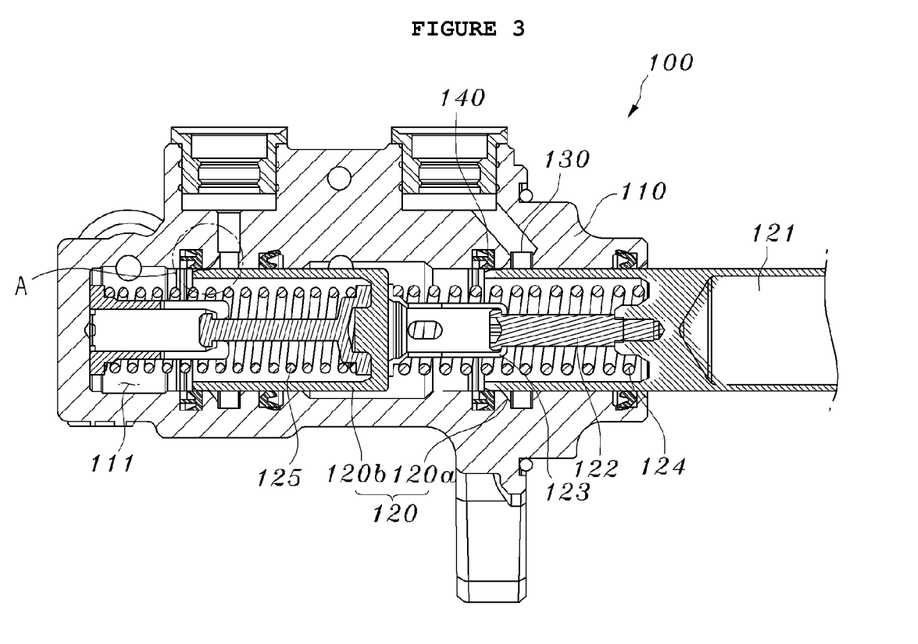
FIG. 3 is a sectional view illustrating a master cylinder for a vehicle, according to exemplary embodiments of the present invention.

FIG. 3 is a sectional view illustrating a master cylinder 100 for a vehicle, according to exemplary embodiments of the present invention.

Referring to FIG. 3, the master cylinder 100 according to exemplary embodiments of the present invention includes a housing 110, a piston 120, inlet ports 130 into which oil is drawn from oil tanks, and seals 140 which are provided at positions spaced apart from the corresponding inlet ports 130 by predetermined distances.

The housing 110 has therein a liquid pressure chamber 111 which contains oil. The piston 120 is installed in the liquid pressure chamber 111 of the housing 110 and linearly reciprocates in the liquid pressure chamber 110 to control the pressure in the liquid pressure chamber 110.

The piston 120 includes a first piston 120a and a second piston 120b which is operated in conjunction with the first piston 120a.

The first piston 120a reciprocates in the liquid pressure chamber 111 using pressing force of a push rod 121. The circumferential outer surface of a front end of the first piston 120a is stepped inwards, and a distance between it and the circumferential inner surface of the liquid pressure chamber 111 increases towards the end of the first piston 120a. Due to the stepped structure of the front end of the first piston 120a, oil can flow towards the front end of the first piston 120a and then move into the liquid pressure chamber 111.

The second piston 120b is connected to the first piston 120a by a connection rod 122 and a cap 123 which are coupled to the front end of the first piston 120a. The second piston 120b is elastically supported by a first coil spring 124. The circumferential outer surface of a front end of the second piston 120b is stepped inwards to a predetermined depth.

Furthermore, an edge of the stepped first end of each of the first and second pistons 120a and 120b is tapered at a predetermined angle.

A second coil spring 125 is provided between the housing 110 and the second piston 120b. The second piston 120b can be returned to its original state by the elastic force of the second coil spring 125.

The inlet ports 130 are connected to the liquid pressure chamber 111. Oil is supplied into the liquid pressure chambers 111 from the oil tanks (not shown) which are provided in the housing 110.

Each inlet port 130 includes a tapered end 150, the circumferential inner surface of which is inclined towards a seating depression into which the seal 140 is seated. The tapered end 150 guides oil such that it flows from the inlet port 130 towards the first end of the piston.

Each seal 140 is made of elastic material, such as rubber, and is fastened in the corresponding seating depression 112 formed in the housing 110. Depending on the direction in which the piston moves, the seal 140 opens or closes the path along which oil flows from the inlet port 130 into the liquid pressure chamber 111.

The seal 140 has a shape which branches off into three branches, including an outer lip 140a, a center lip 140b and an inner lip 140c. A proximal end of the seal 140 at which the three branches are united is fastened to a first sidewall of the seating depression 112. The outer lip 140a of the seal 140 is fastened to the bottom surface of the seating depression 112. The center lip 140a is fastened to a second sidewall of the seating depression 112. In addition, the inner lip 140c of the seal 140 protrudes into the liquid pressure chamber 111.

Thus, when the piston 120 linearly reciprocates, the inner lip 140c of the seal 140 is brought into contact with or is away from the circumferential outer surface of the piston 120 depending on the position of the piston 120. During the reciprocation of the piston 120, when the front end of the piston 120 is away from the inner lip 140c, oil flows into the liquid pressure chamber 111. When the front end of the piston 120 comes into contact with the inner lip 140c, oil is prevented from entering the liquid pressure chamber 111.

FIGS. 4 through 8 illustrate various examples of the shape of the first end of the piston 120 according to exemplary embodiments of the present invention.

Figure 4:
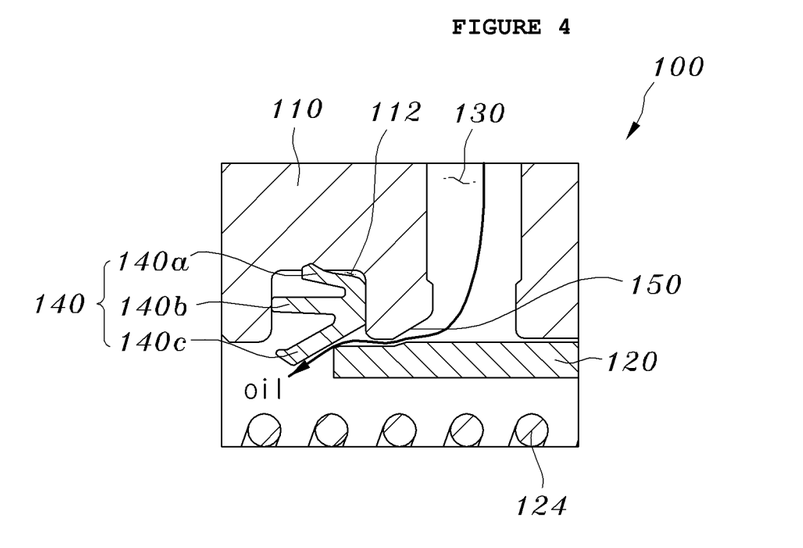
FIG. 4 is a sectional view showing an example of a planar edge of a piston of the master cylinder of FIG. 3.

FIG. 4 is a sectional view showing an example of a typical planar edge of the first end of the piston 120. In this example, of course, the stepped portion is formed in the first end of the piston 120, such that oil supplied through the inlet port 130 can be smoothly guided to the first end of the piston 120.

Figure 5:
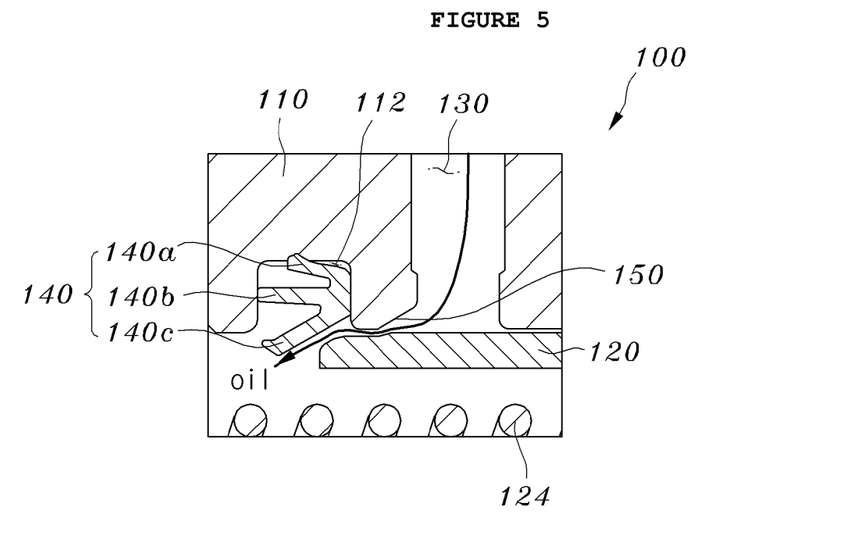
FIG. 5 is a sectional view showing an example of a round edge of a piston of the master cylinder of FIG. 3.

FIG. 5 is a sectional view showing an example of a round edge of the first end of the piston 120. In this example, oil can be more smoothly moved into the liquid pressure chamber 111.

Figure 6:
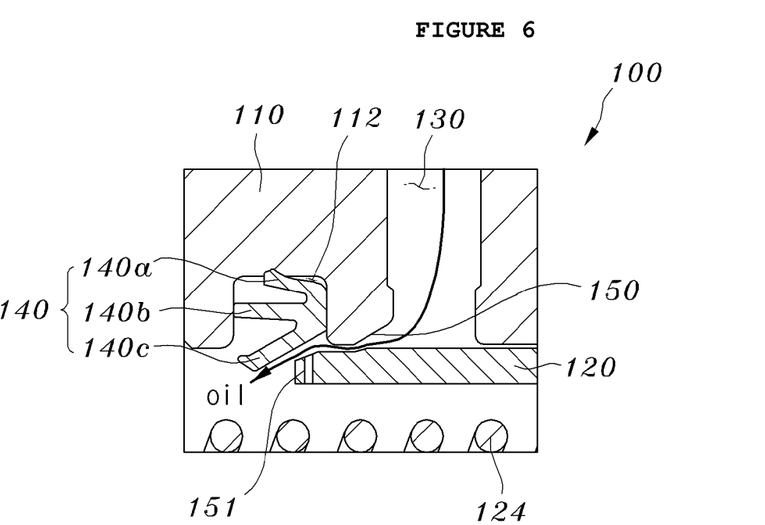
FIG. 6 is a sectional view showing an example of a through-hole formed through a piston of the master cylinder of FIG. 3.
Figure 7:
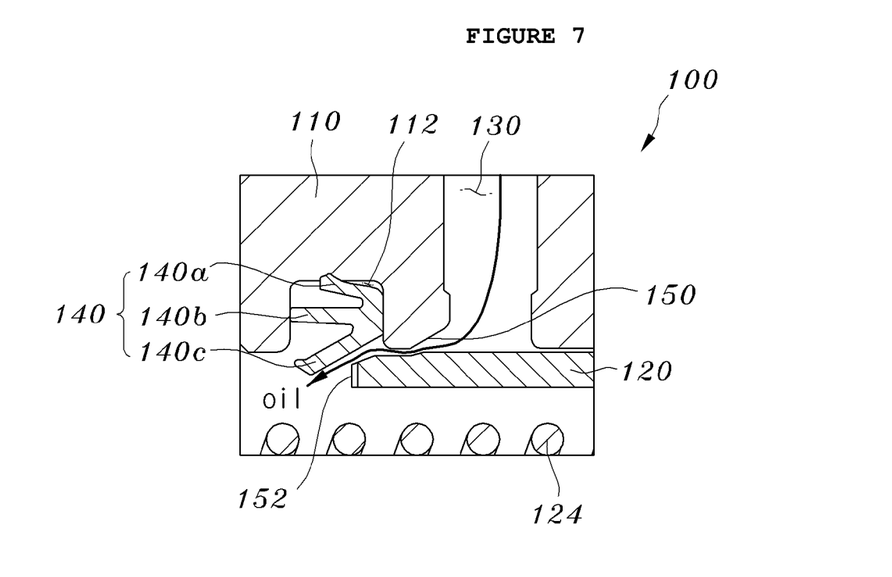
FIG. 7 is a sectional view showing an example of a groove formed in a piston of the master cylinder of FIG. 3.

As shown in FIGS. 6 and 7, to precisely control a dead stroke, a through-hole 151 may be formed through the stepped portion of the first end of the piston 120 in a thickness-wise direction or, alternatively, a groove 152 may be formed in the edge of the first end of the piston 120 in a thickness-wise direction.

Figure 8:
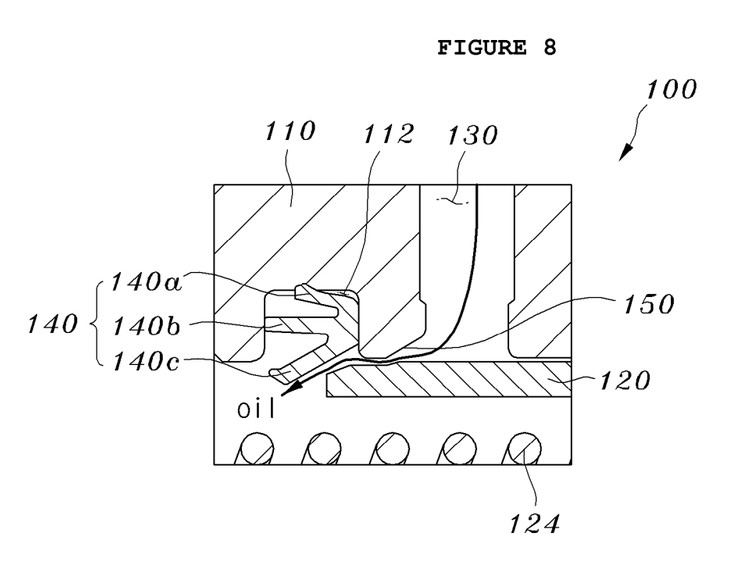
FIGS. 8 through 14 are enlarged views showing a circled portion "A" of FIG. 3 to illustrate reciprocation of the piston.

Preferably, as shown in FIG. 8, the edge of the front end of the piston 120 is tapered at a predetermined angle. In this example, when the piston 120 comes into contact with the seal 140, oil can be more reliably prevented from being undesirably drawn into the liquid pressure chamber 111, because the surface contact between the piston 120 and the seal 140 is realized.

FIGS. 8 through 14 are enlarged views showing a circled portion "A" of FIG. 3 to illustrate reciprocation of the piston 120.

Referring to FIG. 8, when the piston 120 is in the initial state, the stepped front end of the piston 120 is spaced apart from the seal 140, thus defining a path along which oil is supplied from the inlet port 130 into the liquid pressure chamber 111.

In other words, oil is supplied from the inlet port 130 into the liquid pressure chamber 111 along the outer surface of the stepped first end of the piston 120 through a space defined between the piston 120 and the seal 140.

Figure 9:
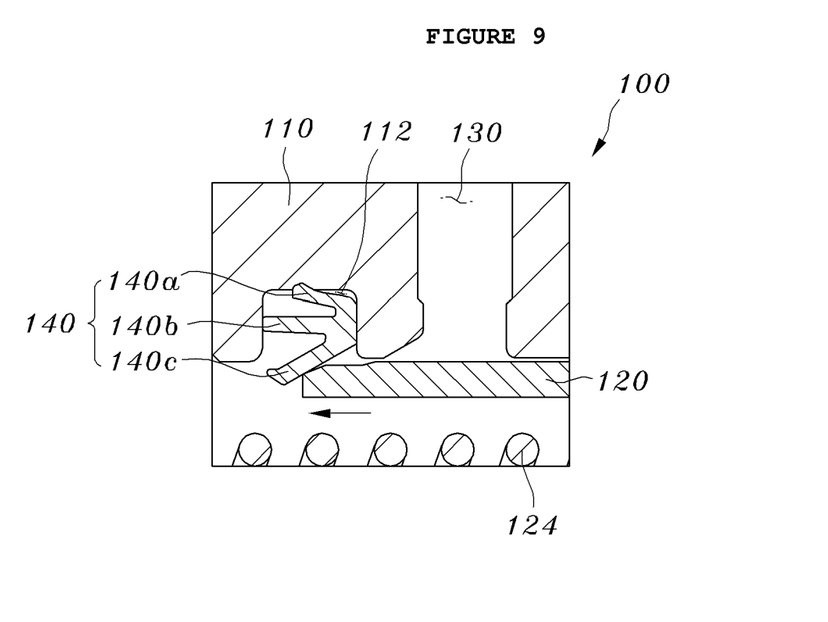

Referring to FIG. 9, when the piston 120 is advanced forwards to compress the liquid pressure chamber 111, the piston 120 first comes into contact with a medial portion of the inner lip 140c of the seal 140.

At this time, the tapered portion of the front end of the piston 120 comes into surface contact with the medial portion of the inner lip 140c.

When the front end of the piston 120 comes into contact with the medial portion of the inner lip 140c of the seal 140, the path along which oil has been supplied into the liquid pressure chamber 111 is interrupted, so that oil can no longer flow into the liquid pressure chamber 111.

When the liquid pressure chamber 111 is sealed by interrupting the path of oil, liquid pressure can be generated in the liquid pressure chamber 111.

Figure 10:
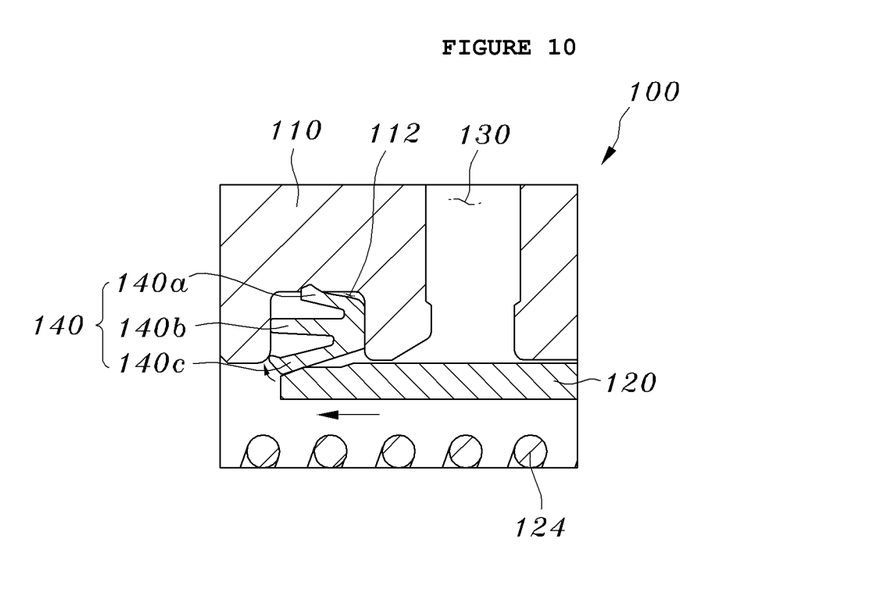
Figure 11:
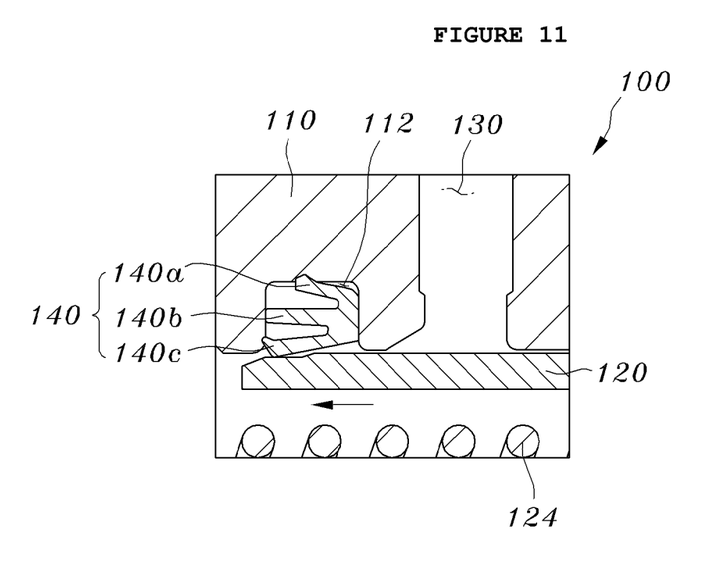
Figure 12:
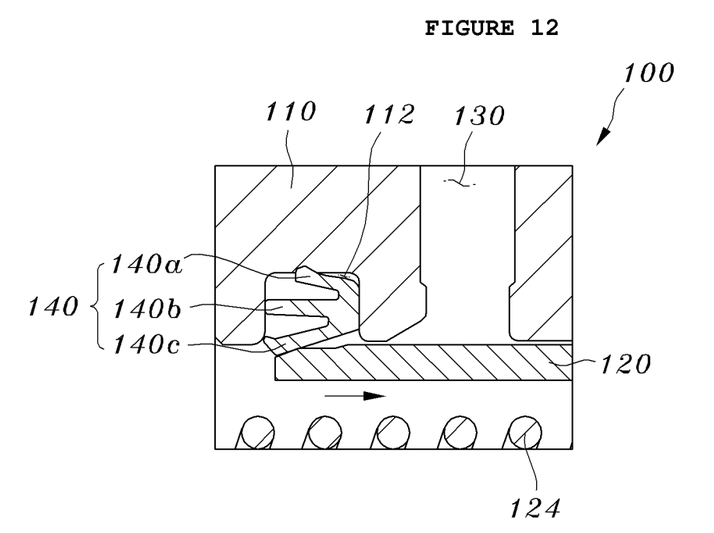
Figure 13:
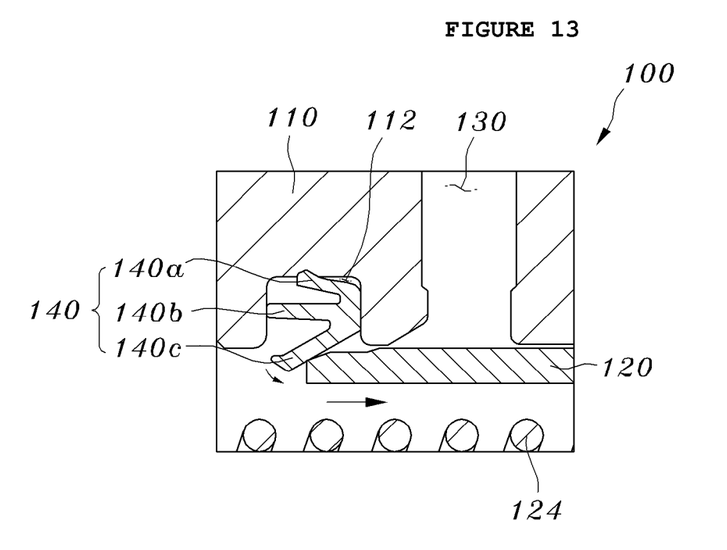
Figure 14:
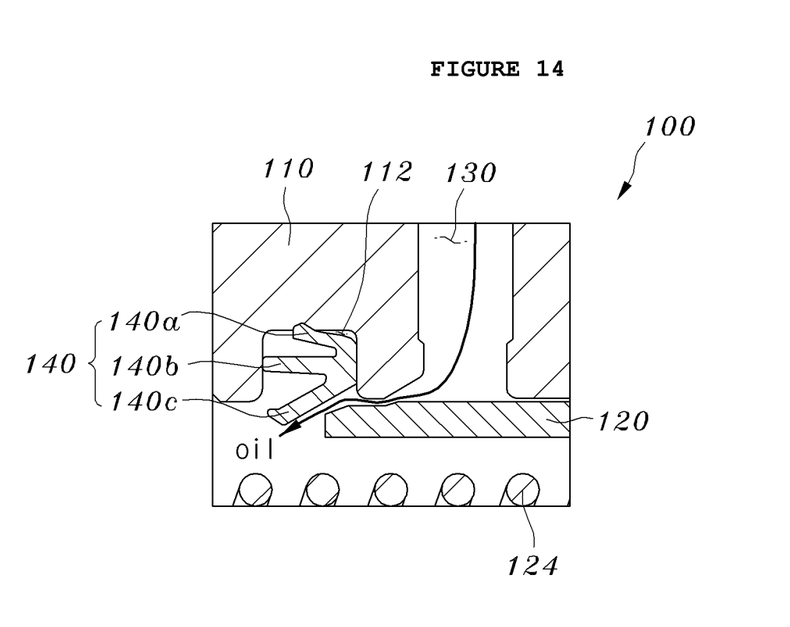

Referring to FIGS. 10 and 11, after the liquid pressure is generated, when the front end of the piston 120 is further advanced over the edge of the inner lip 140c of the seal 140, the pressure in the liquid pressure chamber 111 is increased. Thereby, the brake system of the vehicle can be operated.

Meanwhile, in the case where residual pressure generated by releasing the operation, such as a short stroke, TCS operation, ESC, etc., is applied backwards into the master cylinder 110, the inner lip 140c of the seal 140 may be damaged by the residual pressure. According to exemplary embodiments of the present invention, referring to FIGS. 12 through 14, because the piston 120 maintains the state of being in contact with the inner lip 140c of the seal 140 while the front end of the piston 120 is moved backwards from the edge of the inner lip 140c to the medial portion thereof, the piston 120 can support the seal 140 against the residual pressure.

Therefore, exemplary embodiments of the present invention can prevent the seal 140 from being damaged by the residual pressure.

In the master cylinder having the above-mentioned construction, the front end of the piston has the stepped structure so that a space between the stepped portion of the piston and the seal is used as the path along which oil flows, unlike the conventional technique in which a bypass hole is formed in the piston to supply oil into the liquid pressure chamber. Therefore, the work of processing the piston can be facilitated.

Furthermore, according to exemplary embodiments of the present invention, because the piston supports the seal when the piston is moved backwards, the seal can be prevented from being damaged by residual pressure which is applied to the seal backwards when the braking is released.

As described above, a master cylinder for a vehicle according to exemplary embodiments of the invention can reduce the production cost and make the flow of brake oil smooth. Therefore, the present invention can be effectively used in the vehicle industry.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A master cylinder for a vehicle, comprising:
   a housing comprising a liquid pressure chamber configured to contain oil;
   a piston movably contained in the liquid pressure chamber, the piston configured to reciprocate in the liquid pressure chamber to control pressure in the liquid pressure chamber, the piston comprising a front end comprising a stepped circumferential outer surface;
   a plurality of inlet ports disposed in the housing and configured to supply the oil into the liquid pressure chamber; and
   a seal seated into a seating depression, the seating depression being formed in an inner surface of the housing at a position spaced apart from the inlet ports by a distance, the seal configured to control opening of a flow path of the oil depending on whether the seal is brought into contact with a front end of the piston,
   wherein the oil flows into the liquid pressure chamber along the stepped circumferential outer surface of the piston through a space defined between the piston and the seal.

2. The master cylinder as set forth in claim 1, wherein the seal comprises an outer lip, a center lip, and an inner lip.

3. The master cylinder as set forth in claim 2, wherein the outer lip and the center lip of the seal are fastened to the seating depression, and the inner lip protrudes into the liquid pressure chamber.

4. The master cylinder as set forth in claim 3, wherein an edge of the front end of the piston is tapered.

5. The master cylinder as set forth in claim 4, wherein the tapered edge of the front end of the piston is configured to contact the medial portion of the center lip of the seal.

6. The master cylinder as set forth in claim 2, wherein when the front end of the piston contacts a medial portion of the inner lip, the flow path of the oil is interrupted.

7. The master cylinder as set forth in claim 6, wherein the stepped circumferential outer surface of the front end of the piston comprises a concavely-stepped circumferential outer surface.

8. The master cylinder as set forth in claim 1, wherein an edge of the circumferential outer surface of the front end of the piston is rounded.

9. The master cylinder as set forth in claim 1, wherein a through-hole is formed through the stepped portion of the front end of the piston in a thickness-wise direction.

10. The master cylinder as set forth in claim 1, wherein an end of the inlet port is tapered towards the seating depression.

11. A master cylinder for a vehicle, comprising:
   a housing comprising a liquid pressure chamber configured to contain oil;
   a piston movably contained in the liquid pressure chamber, the piston configured to reciprocate in the liquid pressure chamber to control pressure in the liquid pressure chamber, the piston comprising a front end comprising a stepped circumferential outer surface;
   a plurality of inlet ports disposed in the housing and configured to supply the oil into the liquid pressure chamber; and
   a seal seated into a seating depression, the seating depression being formed in an inner surface of the housing at a position spaced apart from the inlet ports by a distance, the seal configured to control opening of a flow path of the oil depending on whether the seal is brought into contact with the piston,
   wherein the oil flows into the liquid pressure chamber along the stepped circumferential outer surface of the piston through a space defined between the piston and the seal, and
   wherein a groove is formed in an edge of the first end of the piston in a thickness-wise direction.

* * * * *